Figure 4:
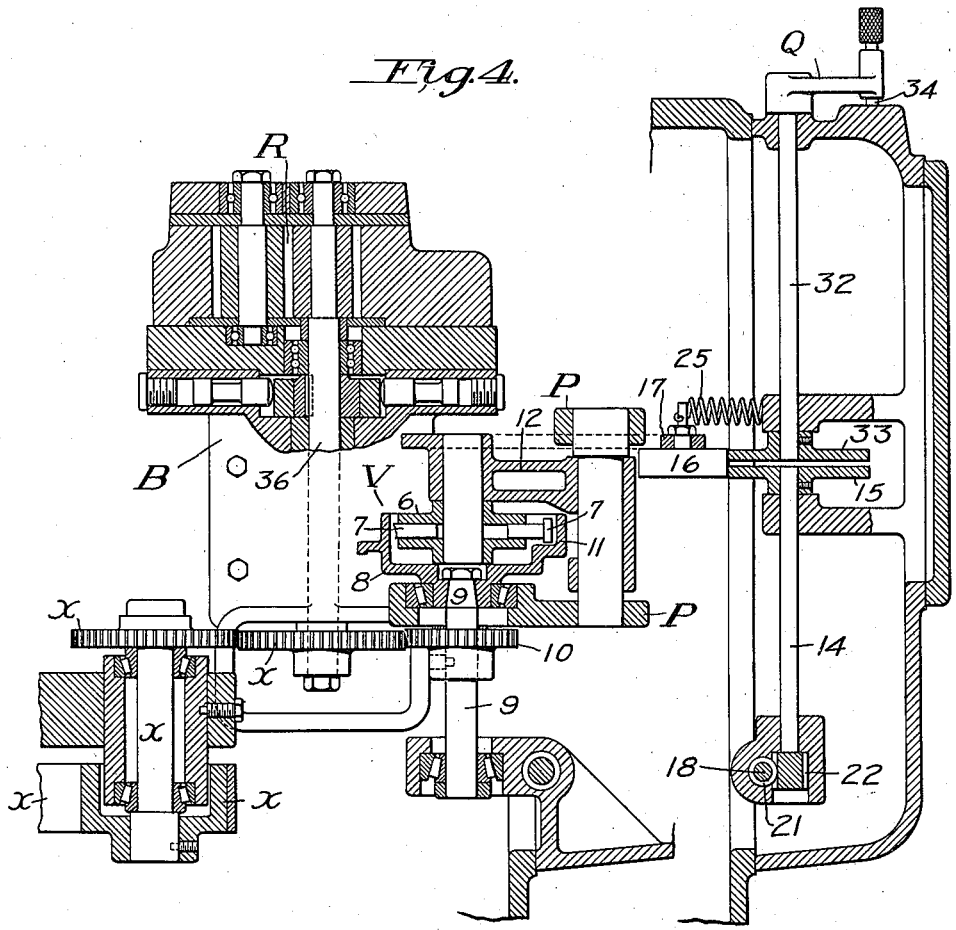

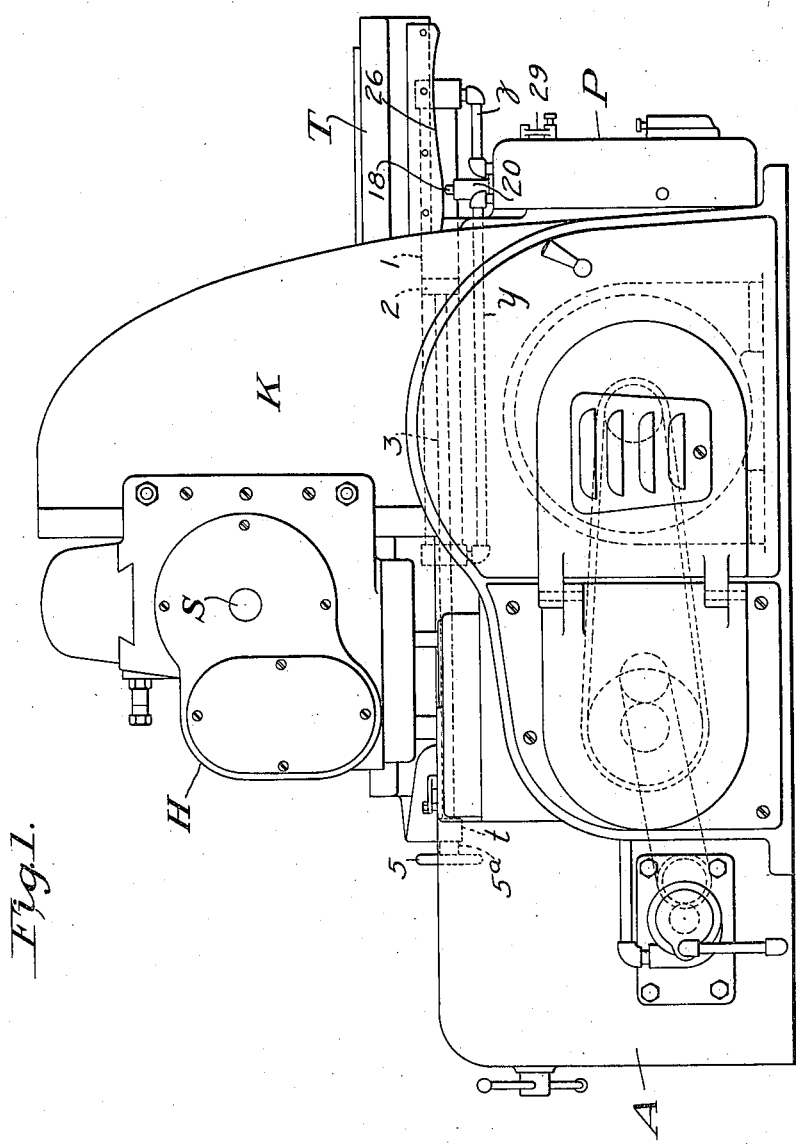

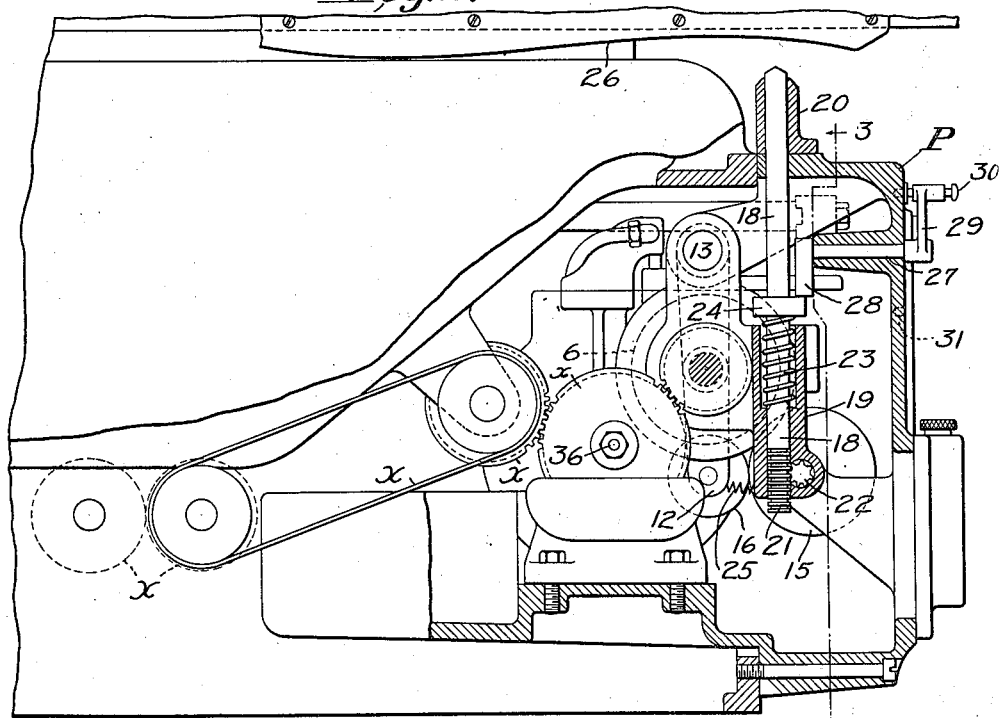
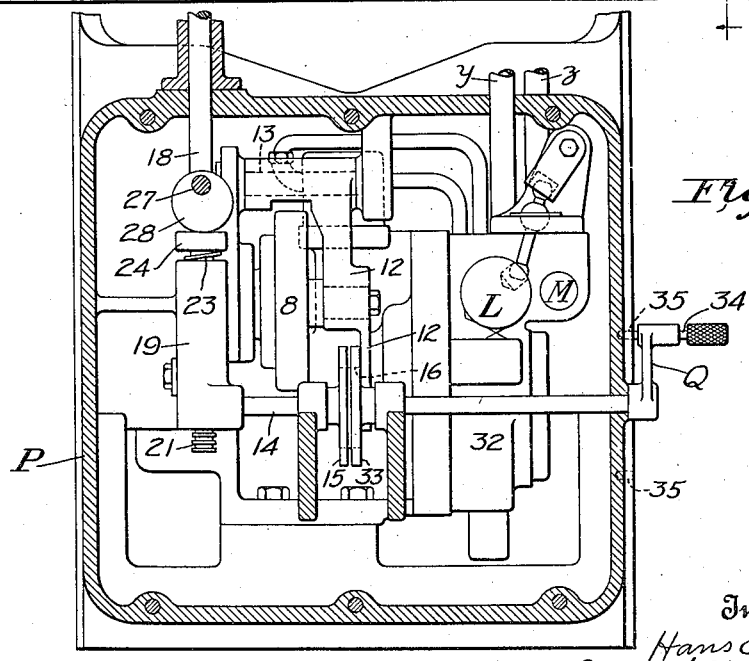

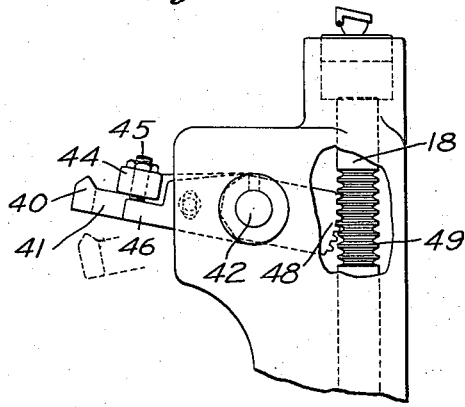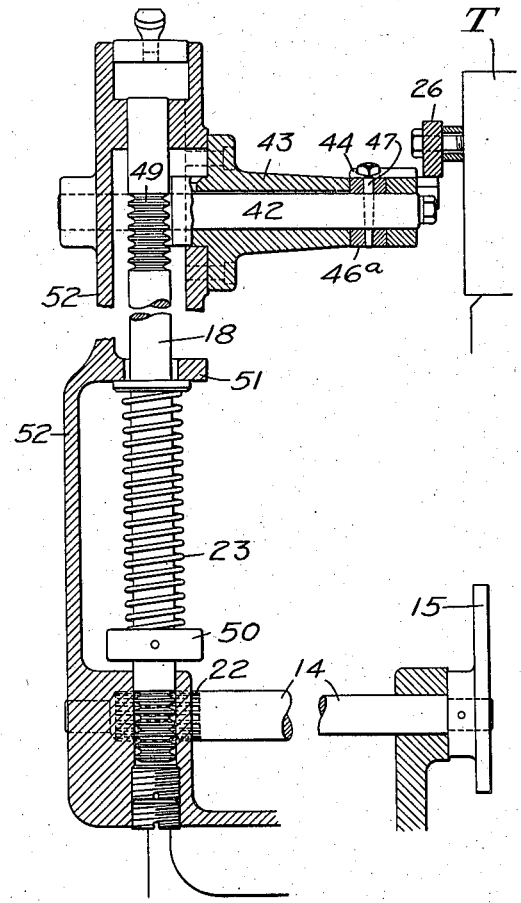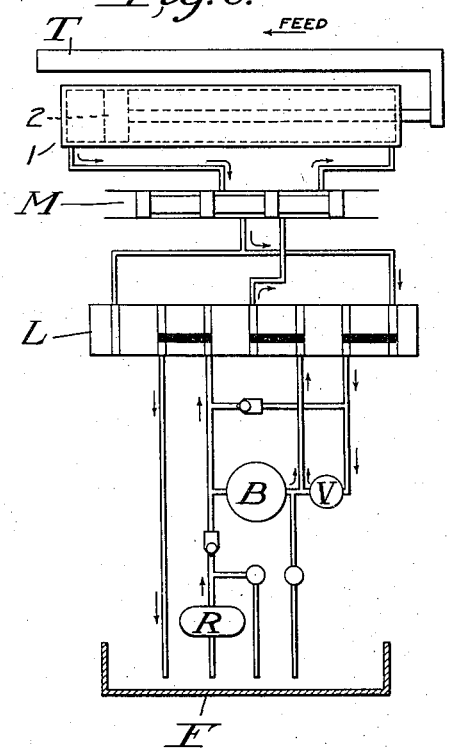

Patented Nov. 5, 1935

UNITED STATES PATENT OFFICE 2,019,487

FEED REGULATOR FOR MACHINE TOOLS

Hans Ernst and Lester F. Nenninger, Cincinnati, Ohio, assignors to The Cincinnati Milling Machine Company, Cincinnati, Ohio, a corporation of Ohio Original application September 15, 1927, Serial No. 220,721. Divided and this application December 18, 1928, Serial No. 326,840

22 Claims. (Cl. 90—21.5)

This invention relates to machine tools and it deals more particularly with improved means for effecting translation of an element thereof, and for varying and controlling the rate of translation of said element.

More specifically stated this invention has for an object to provide improved means for varying the rate of relative movement between a cutting tool and a work-piece, to the end that the relative movement between the two will, at all times, be effected at a rate best suited for machining the work-piece, notwithstanding the fact that the work-piece may be of such a nature or formation as successively to present varying areas or conditions to the action of the tool or varying resistance to relative movement between the work-piece and the tool.

A milling machine is a good example of a machine tool in which this invention may be embodied to advantage, the relative bodily movement between the rotating tool and the translatable table affording the feed, the rate of which is to be varied and regulated. This invention will, therefore, be shown and described in connection with a milling machine but it is to be understood that it is equally adaptable to various other types of machine tools.

The utility of this invention will best be perceived by considering the results attained thereby in connection with a typical problem in machining operations. Suppose, for example, it is desired to maintain a substantially constant power consumption during the milling of the face of a work-piece of T-shape and the feed is in a direction lengthwise of the T, it will readily be perceived that, due to the amount of metal to be removed and consequently the difference in resistance to table movement, the feed rate may be substantially greater during the milling off of that portion of the work-piece corresponding to the stem of the T than during the milling of the part corresponding to the cross-bar thereof. This invention solves the problem presented by such a condition by providing means for varying the feed rate in a predetermined cycle as may be required by the nature of the work-piece to be machined.

Inasmuch as a hydraulic feed lends itself more readily to variations than do mechanical feeds this invention is disclosed in connection with a feed of the former type, but in its broader aspects the invention also contemplates the use of feeds of other types.

Any suitable or preferred hydraulic system may be employed for giving translatory movements to the work table. For example a so-called "closed" system may be utilized i. e. a system in which fluid is drawn from one end of a hydraulic motor and injected into the other end thereof, the rate of movement being determined by the rate at which the fluid is injected; or the so-called "metering system" may be employed, i. e. one in which fluid is forced into one end of a hydraulic motor and the rate of movement of the piston and its connected parts is determined by the rate at which fluid is removed from the exhaust end of the motor as by means of an escapement device. A system of this latter type is clearly disclosed in our pending United States patent application, Serial No. 220,721, filed September 15, 1927, of which this application is a division.

Another object of this invention is to provide improved adjusting means between the hydraulic motor and the work-table actuated thereby, whereby relatively small feeding movements may be given to the work-table manually independent of the action of the hydraulic system.

The objects of this invention have been attained by the embodiment, in a milling machine, of a hydraulic motor connected to reciprocate the work-table. Reciprocatory movements are given to the motor and to the table connected therewith by a continuously acting variable displacement pump adapted through suitable adjustments to pass fluid at any rate from zero to maximum. The pump is connected with the hydraulic motor and the rate of movement of the work-table is determined by the rate at which the pump passes fluid, preferably oil.

The variable pump selected for a practical embodiment of this invention is of that type comprising a laterally shiftable cylinder block providing a plurality of radially disposed cylinders within each of which a piston is slidingly fitted. A rotatable casing surrounds the cylinder block and provides an annular wall engaging the outer ends of the pistons. When the axis of the casing and the axis of the cylinder-block coincide no reciprocatory movement is given to the pistons and pump displacement is at zero, but when the axis of the cylinder block is shifted eccentric to the rotating casing the pistons are caused to reciprocate in their cylinders and pumping action results. The amount of pump delivery is determined by the length of reciprocating of the pistons and this in turn is determined by the amount of eccentricity between the cylinder block and the casing.

This invention attains its objects by providing means for varying the position of the cylinder block relative to the casing element in accordance with the shape, area, or quality of the workpiece being machined.

For quantity production, i. e., where a substantial number of like pieces are to be machined successively, this invention proposes to provide automatic means for shifting the pump successively to vary its displacement in a predetermined cycle as may be required to effect the feed at the most efficient rate for every portion of the work-piece. One means for accomplishing this result comprises a cam, fixed to the work-table, and translatable therewith, and a cooperating element tracking said cam and being operatively connected with the laterally shiftable pump casing. Thus by the formation of the cam the pump may be caused to pass fluid at any available rate between zero and maximum.

Means also is provided for discontinuing the action of the automatic control and for placing the pump under manual control.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 5:
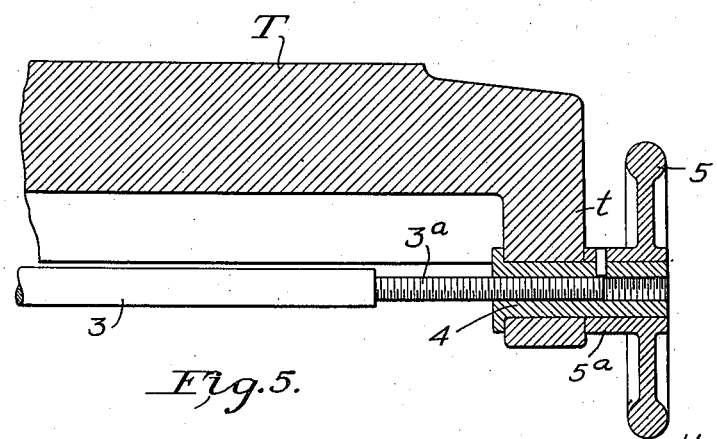

Figure 1 is a side elevation of a milling machine embodying the present invention. Fig. 2 is a detail view, partly in section of a portion of the milling machine, the pump unit for effecting the table feed, and the automatic variator for the variable displacement pump. Fig. 3 is a vertical section through the pump unit taken substantially on the line 3—3 of Fig. 2. Fig. 4 is a horizontal section through said unit. Fig. 5 is a detail sectional view showing a hand adjustment for moving the work-table relative to the piston rod. Fig. 6 is a diagrammatic view representing a hydraulic system to which the present regulating means is adaptable, and Fig. 7 is a detail view of a preferred form of mechanism for controlling the variable pump from the cam carried by the work-table. Fig. 8 is an elevation of a portion of the mechanism shown in Fig. 7.

Referring more specifically to the drawings the invention is disclosed as embodied in a milling machine comprising a base A, translatable work-table T, and rotating tool spindle S, journaled in a head H, adjustably supported upon a standard K, rising from the base.

The hydraulic system utilized for effecting reciprocatory movements of the table at "feed" and "traverse" rates is illustrated diagrammatically in Fig. 6 and comprises a cylinder 1 fixed to the base of the machine; a piston 2, fitted within the cylinder and connected with the work-table by means of a piston rod 3; a suitable low pressure high capacity pump R adapted to effect traversing movements of the table; a high pressure booster pump B, and a variable displacement pump V connected with the cylinder by conduits y and z. Fluid (preferably oil) for use in the system is obtained from a reservoir F located within the machine base and the direction of the flow of fluid through the system, thereby determining the direction of movement of the table, is controlled by a main control valve L.

Briefly stated this valve is adapted to connect the continuously running rapid traverse pump with either end of the cylinder 1 and simultaneously therewith to connect the opposite end of the cylinder with the reservoir, whereby the table T is given rapid traverse movements in either direction. It also serves to connect the rapid traverse pump with the reservoir when rapid movement of the table is not desired.

The valve is also adapted selectively to connect the intake port of the variable displacement pump with either end of the cylinder and simultaneously therewith to connect the exhaust port thereof with the opposite end of the cylinder to effect slow feeding movements of the table in either direction. The booster pump receives fluid from the exhaust line of the rapid traverse pump and injects it into the exhaust line of the variable delivery pump thereby maintaining a high pressure on the intake end of the hydraulic motor. The rate at which the piston 2, piston rod 3 and table T are moved under the influence of this high pressure is determined by the rate at which fluid is removed from the opposite end of the motor by the variable displacement pump which functions as a metering, or escapement, device.

For certain purposes it is desirable to lock the table against movement in either direction. This may be accomplished by means of an auxiliary valve M adapted to isolate the pumps from the hydraulic motor and to trap the fluid in the motor at opposite ends of the piston. With both ends of the cylinder filled with oil, which has no means of escape, the piston and the piston rod will be locked against movement.

Inasmuch as the specific construction of the valves L and M, and means for actuating them, form no part of this invention detailed illustration and description thereof is deemed unnecessary.

To afford manual means for giving the table slight reciprocatory movements relative to piston rod while the latter is locked against movement, the piston rod is connected with the table as shown in Fig. 5. This connection comprises a threaded end 3ª of the piston rod and a complemental nut 4 rotatably journaled in a lug t depending from the table. A hand wheel 5, having its hub 5ª pinned to the nut 4, affords means for rotating the nut on the screw. A flange 4ª on the nut 4 engages one face of the lug t and the hub 5ª engages the other face thereof. The nut is thereby held against translation relative to the table, and rotation of the nut on the stationary screw effects translatory movement of the nut and table.

The variable escapement metering device which regulates the rate at which fluid is ejected from the feed cylinder may be of any suitable or desired construction. There is shown in Figs. 2, 3 and 4, one form of device which accomplishes this result satisfactorily. This device consists of a variable displacement pump of that type comprising a non-rotating cylinder block 6 provided with a plurality of radially disposed cylinders within each of which is slidingly fitted a piston 7. A rotatable casing element 8 fixed to a shaft 9, driven by a gear 10, surrounds the piston block and is formed with an annular wall 11 adapted to engage the outer ends of the pistons. When the axis of the cylinder block and the axis of the casing element are arranged eccentric to each other and the casing element 8 is rotated the wall 11 of the casing element alternately forces inwardly on the piston 7 to eject from the cylinder the fluid which previously had been admitted thereinto during outward movement of the piston. When the axes of the cylinder block and the casing 6 are concentric the pump pistons are maintained non-reciprocable and pump displacement is at zero. It will therefore be perceived that the rate of delivery of the metering device is determined by the relative positions of the axes of the cylinder block 6 and the casing 8. To provide for varying the relative positions of these two elements thereby to vary the rate of pump delivery, the cylinder block is supported by a rock arm 12 journaled upon a pintle 13 fixed in the casing P of the pump unit.

A feature of this invention resides in the provision of means for automatically changing the effective action of the metering device during unidirectional movement of the work table whereby the table may be caused to move at varying rates to provide a feeding rate best suited for machining a work piece having a surface of varying area or offering varying resistances to table movement. To that end there is journaled within the casing P a shaft 14 and upon which is secured an eccentric 15 which engages a roller 16 carried by the free end of the rock arm 12. A plunger rod 18 reciprocable in bearings 19 and 20 carries a circular rack 21 which meshes with a pinion 22 on the shaft 14. A coil spring 23 interposed between the bearing 19 and a collar 24 on the plunger rod normally serves to elevate the plunger rod and thereby rotate the pinion 22 and eccentric element 15 to a position wherein it puts the arm 12, in opposition to the action of a spring 25, to a position in which it effects maximum pump displacement. Upon the reciprocating work-table T there is secured a cam 26, the face of which engages the upper end of the plunger rod 18. Upon reciprocation of the table, the cam will act to depress, and to permit to elevate, the plunger bar 18 which through the parts previously described will effect the swinging movement of the arm 12 to increase or decreases the eccentricity of the cylinder block 6 with respect to the casing 8, whereby to vary the effective action of the metering device and consequently varying the rate of table feed. It is to be understood that the cam 26 will be formed in accordance with the form and nature of the work piece to be machined or the resistance to table movement offered thereby and that this feed regulator will be used primarily for quantity production.

Manual means is provided for throwing out the automatic control for the variable displacement pump. This means comprises a shaft 27 journaled in casing P and an eccentric 28 affixed thereto and engaging the upper side of the collar 24. A crank 29 affixed to the outer end of the shaft 27 serves to rotate the shaft and eccentric either to the position shown in Figs. 2 and 3, in which the eccentric acts upon a collar 24 and depresses the plunger bar 18 to its maximum extent, or 180° therefrom which permits the plunger 18 to move upwardly to its maximum extent. A spring pressed plunger pin 30 carried by the crank 29 is adapted to be inserted in either one of two apertures 31 provided by the casing P.

A manual adjustment of the variable escapement is also provided for varying the feed rate. This comprises a shaft 32 journaled in the casing P, in alignment with the shaft 14, and an eccentric element 33 secured thereto adjacent the automatically actuated eccentric 15 previously referred to. The eccentric 33 also engages the roller 16, and upon rotation of the shaft 32 acts to swing the arm 12. A hand crank Q fixed to the shaft 32 affords means for rotating the shaft, and a spring pressed pin 34, carried by the crank, is adapted to enter any one of a plurality of apertures 35 provided in the casing P, thereby to maintain the parts in any desired position of adjustment. It is to be understood that this manual control will be used when the automatic control, including the cam 26, is rendered ineffective by the action of the feed throwout above described.

Any suitable means may be provided for continuously actuating the rapid traverse pump R, the booster pump B and the variable displacement pump V, all of which are embodied in the casing P. For example, the traverse and booster pumps may be actuated from a common shaft 36, journaled in the casing of the pump unit, which shaft may be rotated from a main drive motor through a train designated generally as $x$. A gear on the shaft 36 may mesh with the gear 10 on the shaft 9 of the variable pump to effect rotation of the pump casing element 8 above described.

It is to be understood that the variable pump controlling-cam 26 is removably secured to the work table T and that it may be removed and replaced by another cam of different contour to produce a different feeding cycle as may be required by any work-piece.

A preferred form of mechanism for connecting the feed control cam 26 with the pump varying eccentric 15 is disclosed in Fig. 7. This mechanism is similar to that illustrated in Figs. 2, 3 and 4 to the extent that it also includes a shaft 14 to which the eccentric member 15 is secured and that said shaft is provided with a pinion 22 which engages a circular rack 21 provided by a vertically movable plunger bar, or slide-rod, 18. It differs from the form previously described in the connection between the slide rod and the feed cam. In the preferred form the effective face of the cam 26 engages a contact point 40 provided by an arm 41 rotatably mounted on a shaft 42 journaled in a bearing bracket 43. The arm 41 has a laterally projecting portion 44 carrying an adjusting screw 45 which rests upon one arm 46 (forming a part of what in effect is a two-armed lever 46a) fixed, as by a pin 47, to one end of the shaft 42. The other arm 48 of the two-armed lever is fixed to the other end of the shaft and has its free end formed as a toothed segment 55 which engages a circular rack 49 formed on the upper end of the slide rod 18.

In this preferred form the coil spring 23, surrounding the slide rod 18, is interposed between a collar 50 pinned to the slide rod and a fixed lug 51 provided by a supporting bracket 52. Thus the spring normally acts to depress the rod and thereby through the lever arms 48, 46 and 41 to elevate the contact point 40 to maintain it in engagement with the effective face of the feed cam 26. The position to which the parts are normally moved by the spring 23 effects minimum pump displacement which may be increased by downward movement of the contact 40 and consequent upward movement of the rod 18.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States.

1. A machine tool combining a rotating cutter; a work table movable relative thereto; hydraulic means for feeding said work table; a variable controlling means for determining the rate of feed of said table under the action of said hydraulic means; a cam carried by said work-table and bearing a definite relation with a work piece on said table; and means constantly under the control of said cam for varying said controlling means thereby to determine the feed rate of said table throughout a uni-directional movement thereof in accordance with the work-piece.

2. A machine tool combining a reciprocable work table; hydraulic means for reciprocating said table, said means including a cylinder, a piston reciprocable in said cylinder, one of the last named members being stationary and the other connected with the reciprocable table; means to admit fluid pressure into one end of said cylinder; a variable escapement means for permitting fluid to be exhausted from the other end of the cylinder in measured amounts thereby to determine the rate of feed of said table; and means actuated in timed relation with the movement of the table and during a uni-directional movement thereof for varying the action of said escapement device and thereby the rate of table feed.

3. A machine tool combining a reciprocable work table; hydraulic means to feed said table, said means including a cylinder, a piston therein, one of which is connected with the table, and means to admit fluid pressure into one end of said cylinder to effect relative movement between the cylinder and piston; variable escapement means connected with the exhaust end of the cylinder positively to limit the rate of exhaust thereby to determine the rate of feed of said table; automatic means for controlling the escapement means to vary the feed rate; and means to render said automatic control means ineffective.

4. A machine tool combining a reciprocable member, hydraulic means including a hydraulic motor and a variable delivery pump connected therewith to effect reciprocation of said member at varying rates, said pump including a shiftable element adapted in its various positions to effect pump delivery at varying rates; automatic control means for said pump including a pattern cam movable in timed relation with said reciprocable member and an element actuated by said cam and connected to move said shiftable element to vary the rate of pump delivery and thereby the feed rate of said reciprocable member; means to render said automatic control means ineffective; and manual means operable thereafter to control the action of said variable delivery pump.

5. A machine tool combining a reciprocable member, hydraulic means including a hydraulic motor and a variable delivery pump connected therewith to effect reciprocation of said member, said pump including a shiftable element adapted by its various positions to vary the rate of pump delivery from zero to maximum; means normally tending to hold said element in one of its extreme positions; an eccentric device engaging said shiftable element and adapted to vary its position; a plunger bar; a rack and pinion connection between said plunger bar and said eccentric device; a feed controlling cam carried by said reciprocable member; a lever actuated by said cam; and a rack and pinion connection between said lever and said plunger bar, whereby action of said cam on said lever effects, through said rack and pinion connections and said plunger bar, pump-varying adjustments of said eccentric device.

6. A machine tool combining a translatable work table, an hydraulic motor connected with said table; a reservoir containing fluid; a high capacity low-pressure pump adapted to draw fluid from said reservoir and deliver it into said motor to effect rapid traverse of said work-table; a high pressure pump adapted to receive fluid from said reservoir and deliver it into one end of said motor to effect movement of said table at a feeding rate; a variable delivery pump adapted to be connected with the discharge end of said motor to control volumetrically the rate at which fluid is discharged therefrom thereby to regulate the rate at which the table is moved by said high pressure pump; a cam bearing a definite relation with a workpiece carried by said table; and control means relatively movable with respect to said cam and constantly under the influence thereof for varying the effective capacity of said variable delivery pump thereby to determine the rate of feed of said table during an entire feed movement.

7. A machine tool combining a work-table; an hydraulic motor connected with said work-table; a reservoir containing fluid; a high capacity low pressure pump adapted to draw fluid from said reservoir and deliver it into said motor to effect rapid traverse of said work-table; a high pressure pump adapted to receive fluid from said reservoir and deliver it into one end of said motor to effect movement of said work-table at a feeding rate; a variable escapement means connected to the other end of said motor to regulate the rate at which fluid is discharged therefrom, thereby to determine the rate at which the table is fed under the influence of said high pressure pump; a pattern cam bearing a definite relation with a workpiece carried by said work-table; and control means relatively movable with respect to said cam and constantly under the control thereof for varying the action of said escapement means thereby to determine the rate of feed movement of said table under the influence of fluid delivered by said high pressure pump.

8. In a machine tool, a translatable work-table; an hydraulic motor connected therewith; means for admitting relatively low pressure fluid into said motor at a relatively fast rate to effect rapid traverse movement of said work-table; means for admitting relatively high pressure fluid into said motor at a relatively slow rate thereby to effect feeding movements of said table; valve means for selectively rendering effective said rapid traverse and feeding rates; variable controlling means for varying the feeding rate of said work-table in accordance with a workpiece carried thereby, said means including a variable feed rate controller, a pattern cam coextensive with and bearing a definite relation with the workpiece and movable with said table relative to said controller, a cam engaging element, and a direct connection between said cam engaging element and said controller whereby the controller is actuated by and maintained constantly under the influence of said cam during a feeding movement.

9. A machine tool combining a reciprocable member, and hydraulic means for reciprocating said member, said means including a hydraulic motor and a variable displacement pump connected therewith, said pump having a shiftable element movable to effect increases and decreases in the rate of pump delivery and thereby the rate of movement of said reciprocable member, a cam having a contour varying in accordance with the variable tooling requirements for machining a selected work-piece, power transmitting linkage connectible between said cam and element, means effecting relative movement between the cam and linkage in correspondence with the movement of the reciprocable member, and means to maintain the cam, linkage and element in constant power transmitting engagement during said relative shifting, whereby the cam contour reacts directly on the pump incrementally and decrementally to control its effective delivery during the tooling operation.

10. A machine tool combining a reciprocable member; hydraulic means for reciprocating said member, said means including a hydraulic motor and a variable displacement pump connected therewith, said pump having a shiftable element adapted in its various positions to vary the rate of pump delivery and thereby the rate of movement of said reciprocable member; means normally tending to shift said element to one of its extreme positions; an actuator element mechanically connected directly with said shiftable element; a variably contoured cam engaging continuously said actuator element, said actuator element and cam being mounted for relative movement by the movement of said reciprocable member to shift said actuator element and thereby to operate directly the shiftable element of the pump to vary the delivery rate of said pump incrementally and decrementally in accordance with the varying contour of said cam.

11. A machine tool combining a work carrier; a tool carrier; hydraulic means embodying a variable rate pump for propelling one of said carriers; a regulator varying the rate of said means; an automatic trip operated by one of said carriers and having a lost motion connection with said regulator; and a manual limit stop for varying the amount of said lost motion.

12. A machine tool combining a reciprocable work table; hydraulic means to feed said table, said means including a cylinder, a piston therein, one of which is connected with the table, and means to admit fluid pressure into one end of said cylinder to effect a relative movement between the cylinder and piston; variable escapement means connected with the exhaust end of the cylinder positively to limit the rate of exhaust thereby to determine the rate of feed of said table; automatic means for controlling the escapement means to vary the feed rate; means to render said automatic control means ineffective; and manually actuated means, operative when said automatic means is rendered ineffective, for controlling the escapement means, thereby to vary at will the rate of table feed.

13. A machine tool combining a work carrier; a tool carrier; hydraulic means embodying a variable rate pump for propelling one of said carriers; a regulator varying the rate of said means; an automatic trip operated by one of said carriers and having a lost motion connection with said regulator; and a manual throw-out for rendering said regulator inoperative.

14. In a machine tool, the combination of a movable member, a transmission therefor including an adjustable rate changer and an element driven therethrough, means automatically operable in accordance with the movement of said element to adjust said rate changer, whereby to maintain the rate of said member substantially at a predetermined value, and means alternatively adjustable for said automatically operable means to be operative or inoperative.

15. In a machine tool the combination of a movable member, a transmission therefor including a hydraulic portion and an element driven therethrough, said hydraulic portion being in part adjustable to change the rate of movement of said member, means automatically operable in accordance with movement of said element to adjust said adjustable part, whereby to substantially maintain any desired rate of said member, and means alternatively adjustable for said automatically operable means to be operative or inoperative.

16. In a machine tool the combination of a movable member, a transmission therefor including an adjustable rate changer, manual means for adjusting said rate changer, means for adjusting said rate changer in accordance with the movement of said member, independent means operative on said rate changer for the adjustment thereof from each of said adjusting means, and means for selectively rendering said movement operated means operative or inoperative while maintaining the operation of said manual means.

17. In a milling machine the combination of a rotatable tool spindle, a work support movable relative thereto in a path transverse to the spindle axis, a transmission for said spindle, a train driven from said spindle transmission for movement of said work support and including a fluid operable portion in part adjustable for changing the rate of movement of said work support and also including an element driven through said fluid operable portion, and means automatically operative to adjust said portion.

18. In a machine tool the combination of a movable support, a transmission for movement thereof including a fluid operable portion in part adjustable for changing the rate of support movement, a first means shiftable for adjusting said portion to a position approximately productive of a desired rate of support movement, other means shiftable independently of said first means for additionally adjusting said portion, and means for shifting said other means in accordance with the movement of said support.

19. In a machine tool having a movable support the combination of a transmission for movement thereof including a fluid operable portion in part adjustable for changing the rate of support movement, a power operated shifter for adjustment of said portion, and a control device for said shifter including a member manually shiftable to a variety of positions, and a member shiftable in accordance with movement of said support, said device being operative in accordance with the relative position of said members.

20. In a machine tool, the combination of a movable member, a transmission therefor including adjustable rate change means, manual means for adjusting said rate change means to approximately predetermine a desired rate, other means for further adjusting said rate change means in accordance with changes in some of the operating conditions of said machine tool, and control means alternatively adjustable for selectively preventing or permitting the adjustment of said rate change means from said other means.

21. In a machine tool, the combination of a movable member, a transmission therefor including an hydraulic motor and an adjustable pump connected for operation of said motor, manual means for adjusting said pump, other means for further adjusting said pump in accordance with variations in some of the operating conditions of said machine tool, and means alternatively adjustable for selectively preventing or permitting the adjustment of said pump from said other means.

22. In a machine tool, the combination of a movable member, a transmission for movement thereof including a fluid operable portion of part adjustable to change the rate of support movement, a manual means movable for adjustment of said portion to select a desired rate of support movement, and other control means operative to adjust said portion to effect the desired rate of support movement in spite of variations in the operating conditions of the machine.

HANS ERNST.
LESTER F. NENNINGER.